March 8, 1966  SHIZUKI URANISHI  3,239,724
CURRENT RESPONSIVE CONTROL BRIDGE SYSTEM
Filed Sept. 30, 1963  4 Sheets-Sheet 3

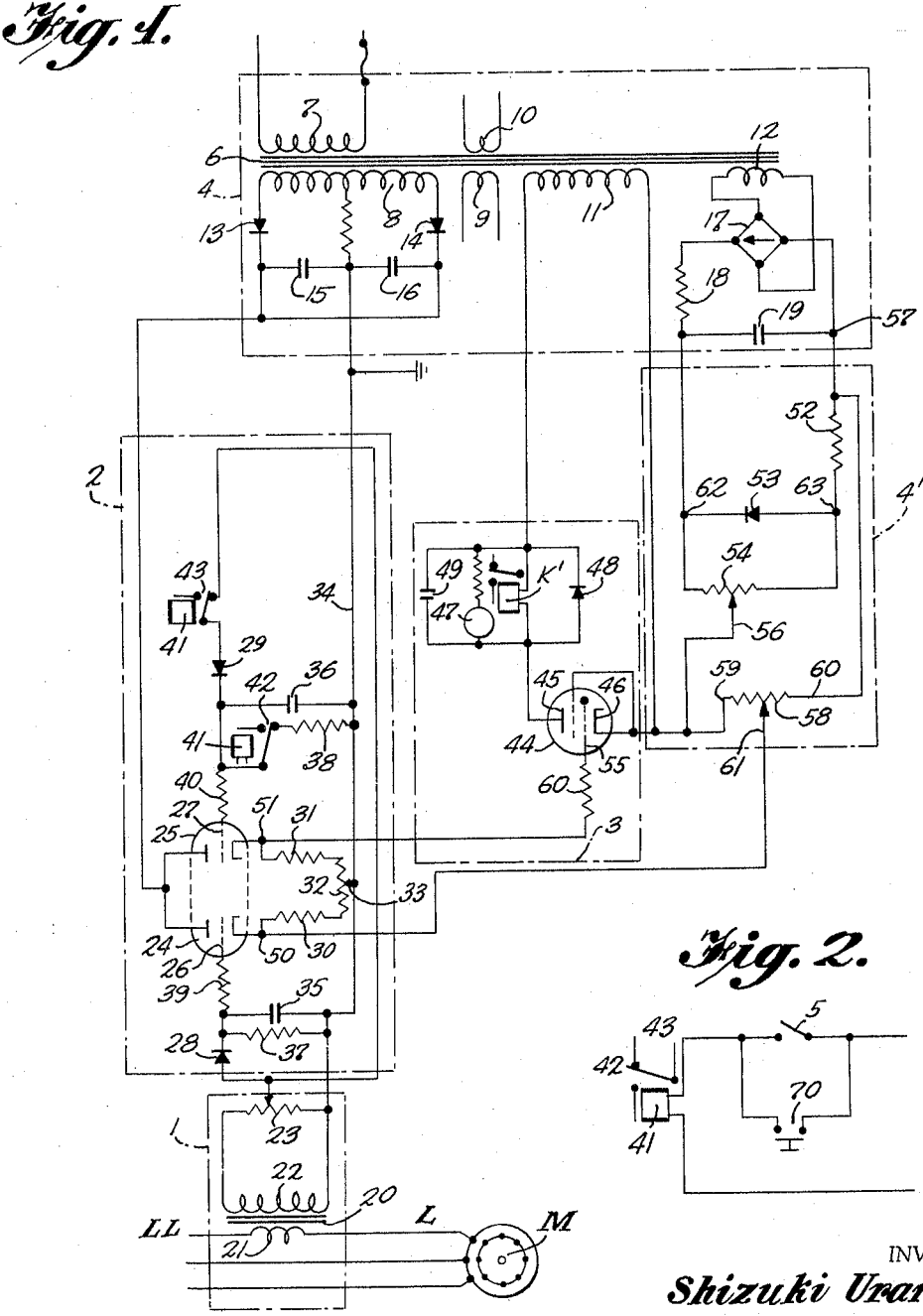

INVENTOR
Shizuki Uranishi
BY Mason, Fenwick & Lawrence
ATTORNEYS

March 8, 1966  SHIZUKI URANISHI  3,239,724
CURRENT RESPONSIVE CONTROL BRIDGE SYSTEM
Filed Sept. 30, 1963  4 Sheets-Sheet 4

INVENTOR
*Shizuki Uranishi*

BY *Mason, Fenwick & Lawrence*
ATTORNEYS

United States Patent Office 3,239,724
Patented Mar. 8, 1966

3,239,724
CURRENT RESPONSIVE CONTROL
BRIDGE SYSTEM
Shizuki Uranishi, Osaka, Japan, assignor to Koyo Seiko Company, Ltd., Osaka, Japan, a corporation of Japan
Filed Sept. 30, 1963, Ser. No. 312,750
Claims priority, application Japan, Oct. 6, 1962, 37/44,412, 37/44,413
7 Claims. (Cl. 317—153)

This invention relates to a device for correcting changes in the electric source voltage and phase of a switching control apparatus responsive to variations in current drawn by electric motors to effect certain control functions.

When a number of electric motors and switching control apparatus therefor are used in a factory, the motors are run by commercial alternating current except in special cases. But this current has a great many common loads emanating from the same source which comprise a wide variety. At the same time, the greater part of these loads converge within the workshop and are always subject to increase, decrease or displacement. The voltage and phase of an electric source frequently change in a complicated way, and such changes are always indefinite in time and extent, occurring at an interval of several seconds or several hours. When, therefore, a motor supplied with such a current is worked, especially a three-phase motor, current consumed will change with time in accordance with the foregoing changes in voltage and phase, and current flowing along one of the lines changes still more, even if the load of the motor is kept constant.

This latter change is great, especially in the case of a small motor. To give an example, in the case of a light load which runs a machine idly, it is not rare that the value of current changes about a normal current of approximately 15 A. by ±2 A., namely, ±13%. Such a change gravely affects the operation of a switching control apparatus run by an electric detector which presupposes constant electric source voltage and phase. To take, for example, a switching control apparatus using a control bridge system, when the value of current running along one line changes by 10% as compared with that of the load of a motor with normal electric source voltage and phase, it is outside the detecting capacity of the control bridge system to decide if this change is due to a change in the load of the motor or a change in electric source voltage and phase. So a control bridge system effects switching control in accordance with changes in the value of current flowing along one line at a given load of a motor. Accordingly, a change in the electric source voltage and phase of a motor upsets the working of a control bridge system and causes an imperfect or wrong operation in an automatic machine which is to go through switching control. A change in electric source voltage also alters control voltage supplied to the grid of a thyratron or the signal detecting section of a control bridge system. This change exceeds that of the conduction point of a thyratron caused by a change in the plate voltage originating from the same electric source. This also does harm to the switching control function of a control bridge system.

When, therefore, electric source voltage changes to a comparatively large extent, the above-mentioned two difficulties arise in a switching control apparatus using a control bridge system and often paralyze the normal operation of a machine. In order to remove these obstacles arising from a change in the electric source voltage and phase of a switching control apparatus, it is desirable, of course, to install voltage and phase correctors for the motor, but this is economically difficult. To adjust by hand the working standard of a control bridge system every time electric source voltage and phase change runs counter to the complete automation of a machine, and in some kinds of machinery and switching control function for an automatic machine will be lost. To introduce a voltage corrector between a control bridge system and the electric source is not a good method, because it is costly and makes it difficult to make a switching control apparatus small and light.

The present invention employs a direction switch to respond to a particular movement of a machine worked by a switching control apparatus and to provide a comparison standard for a control bridge right before a change in the load of a motor takes place. The control bridge system has a comparing section which, based on these standards, stores signals representing current consumed by the associated motor at that movement and compares them with values detected later. The present invention proposes a device for correcting changes in the electric source voltage and phase of a switching apparatus using a control bridge system provided with this comparing section, a detector with a thyratron to respond to comparative values of load signifying current sensed by the comparing section, and a grid voltage corrector which corrects the conduction point of the thyratron automatically by adjusting grid control voltage.

An object of the present invention is, therefore, to propose a switching control apparatus which works constantly irrespective of changes in electric source voltage and phase.

Another object is to propose a control bridge system which decides the detection point automatically by a direction switch connected with the operation of a machine to which switching control is to be applied.

A third object is to propose a switching control apparatus with a control bridge system having a comparing section to store the detection point automatically decided and to compare it with a value detected later.

A fourth object is to propose a switching control apparatus using a control bridge system with a thyratron detector to find out the value detected in the comparing section.

A fifth object is to propose a new means to store the detection point automatically detected, compare it with the value detected later, indicate the deviation and conduct switching control in accordance with the extent of the deviation.

A sixth object is to propose a switching control apparatus using a control bridge system equipped with a corrector of changes in electric source voltage which makes it possible to choose at ones option the rate of automatic correction of the conduction or firing point of the grid control voltage of a thyratron according to changes in electric source voltage and phase.

The present invention has the advantage that a switching control apparatus does its normal job in accordance with a change in the load of a motor without controlling by hand the detection point of a control bridge system, even if the value of the current of a motor changes substantially as a result of changes in electric source voltage and phase. It has also the advantage of presenting, in the form of an accessory unit of economically small size, a device for keeping the detecting function of the thyratron of a control bridge system constant irrespective of a change in electric source voltage.

A seventh object of the present invention is to install in a switching control apparatus, chiefly in a control bridge system, a means of correcting changes in electric source voltage and phase.

In the drawings:

FIGURE 1 is the circuit of a control bridge system of a switching control apparatus incorporating the present invention;

FIGURE 2 is the supply circuit of the relay 41 shown in FIGURE 1;

FIGURE 9 illustrates an abrader machine in which the present invention is put into practice. The article to be abraded is suspended over the machine at a position to have its outer circumference abraded by the grindstone A driven by the motor M, while revolving.

Figure 4:
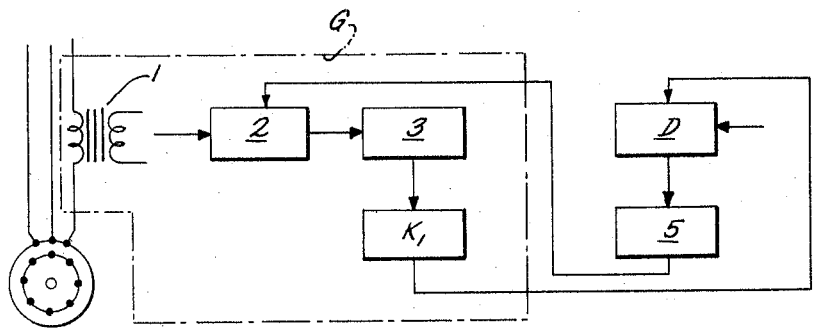
FIGURE 4 is a block diagram to explain the working of FIGURE 1.
Figure 9:
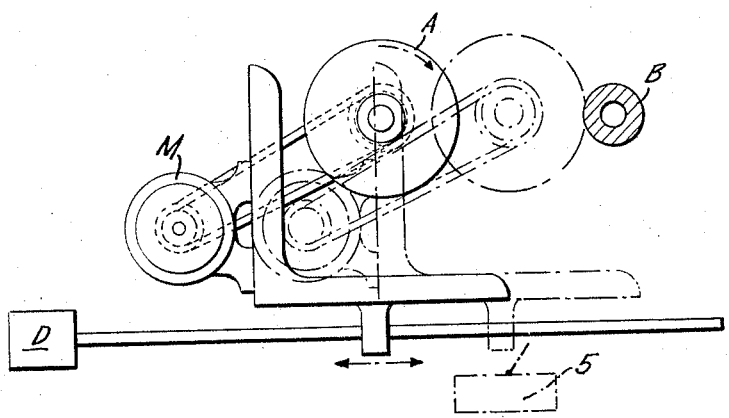
FIGURE 9 is a side elevation view to explain the operation of an abrader equipped with the device of FIGURE 1.

As shown in FIGURE 4, the control bridge system, indicated in general by the reference character G is made up of the following: the sensing transducer 1 connected with a lead of the supply circuit of the motor M, the signal comparing section 2, the detecting section 3, the correcting section 4', for correcting the grid control voltage of the electric source, and the direction switch 5 connected directly or indirectly with the carriage drive mechanism D for the motor and grindstone assembly as illustrated in FIGURE 9.

To go into details, the control bridge system G has the transformer 6 providing appropriate electrical voltage to the various components, whose primary side is connected with the source of commercial electricity, and whose secondary side is equipped with the winding 8 for the signal comparing section 2, the windings 9, 10 for the vacuum tube heaters, the winding 11 for the detecting section 3, and the winding 12 for the grid control voltage source of the thyratron. The winding 8 for the signal comparing section 2 supplies direct current voltage through the rectifiers 13, 14, the smoothing condensers 15, 16, and the impedance. The winding 12 for the grid control voltage source is connected with the smoothing circuit consisting of the recitfier 17, the impedance 18 and the condenser 19, and makes up a direct current source.

In the sensing transducer 1, the current transformer 20 has its primary coil 21 inserted between the lines L, LL of the supply circuit for the motor M, and signals are derived through the secondary coil 22 and the potentiometer 23.

In other words, current flowing through the lines L, LL of the supply circuit for the motor M flows through the primary coil 21 of the current transformer 20, and the voltage generated in the secondary coil 22 is taken out controllably as signals from between one end of the potentiometer 23 and the movable wiper contact.

The signal comparing section 2 includes a bridge circuit, two legs of which are formed by two vacuum tubes 24, 25 which may be the two triode sections of a duo-triode, having grids 26, 27 to which signals from the transducer 1 are applied through the diodes 28, 29. The deviation of the output of the vacuum tubes 24, 25 are applied to the detecting section 3. The plates of the vacuum tubes 24, 25 are connected together and their cathodes 50, 51 are connected through resistors 30, 31 to the potentiometer 32 for correcting the neutral point. The plates of the vacuum tubes 24, 25 and the movable arm of the potentiometer 32 are also connected to the voltage source provided by the winding 8 and associated rectifier components. The internal resistance of the vacuum tubes 24, 25 and the resistances 30, 31 make up the balanced bridge.

The grid resistances 39, 40 of the same value, are connected to the grids 26, 27 of the vacuum tubes 24, 25 and with the movable arm 33 of the potentiometer 32, to return wire 34 and signals are applied through the movable arm of the potentiometer 23 of the transducer 1 and the diodes 28, 29. The polarity of each diode 28, 29 is the same as that of each grid 26, 27, as shown in the figure, and the condenser 35, 36 of the same value, and the resistances 37, 38 are connected in parallel to the return wire 34 from between the grid resistances 39, 40 and the diodes 28, 29. However, the resistance 38 of the vacuum tube 25 is connected to the normally closed contact 42 of the relay 41. Between the diode 29 of the vacuum tube 25 and the movable arm of the potentiometer 23 of the transducer 1 is inserted another closed contact 43 of the relay 41, and one end of the potentiometer 23 is connected to the return wire 34.

That is to say, signals from the transducer 1 are controlled by the potentiometer 23 and applied to the diodes 28, 29, rectified by the diodes 28, 29 and smoothed by the condensers 35, 36 and the resistances 37, 38, and are applied to the grids 26, 27 of the vacuum tubes 24, 25 through the grid resistances 39, 40. In this case, the balance of the bridge is controlled by the adjustment of the potentiometer 32 and the values of the diodes 28, 29 on both sides of the bridge, the resistances 37, 38, the condensers 35, 36 and the grid resistances 39, 40 are the same.

Even if, therefore, signals from the transducer 1 change, the internal resistance of the vacuum tubes 24, 25 changes exactly in the same way and thus the bridge is always balanced.

Figure 3:
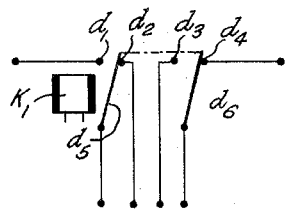
FIGURE 3 is a diagram showing the contact circuit of the relay 41.
Figure 5:
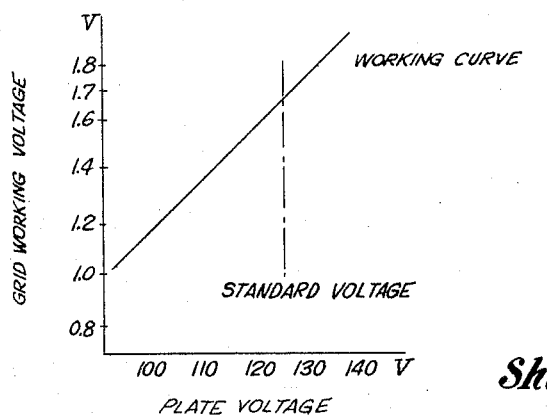
FIGURE 5 is a graph showing changes in the plate voltage as against the grid control voltage of a thyratron used in the present invention.
Figure 6:
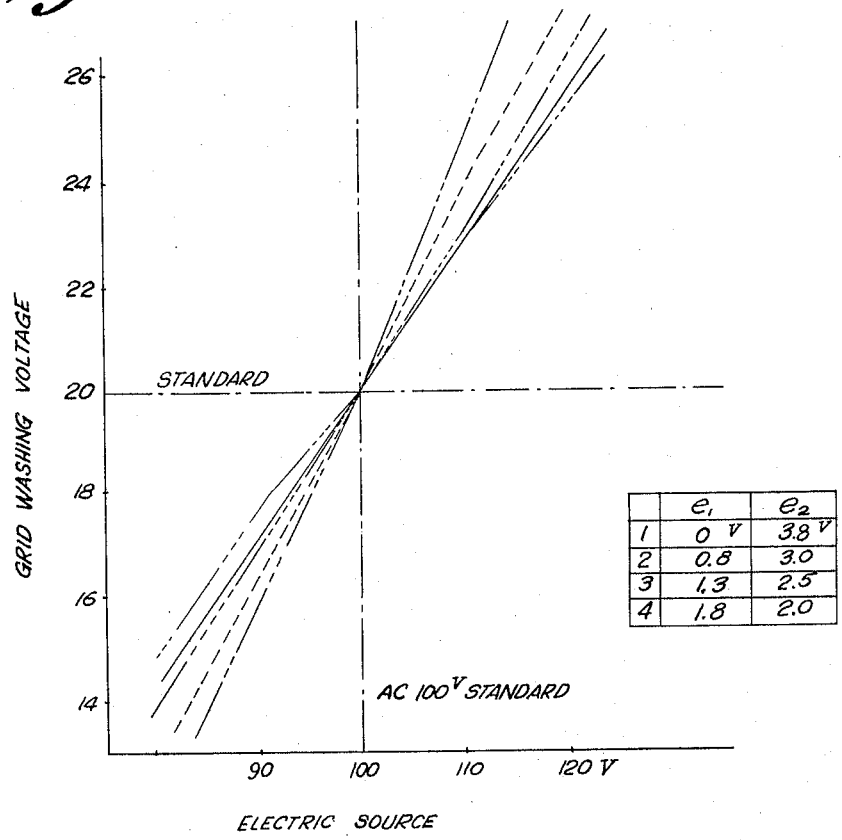
FIGURE 6 is a graph illustrating how various characteristics of the present invention make it possible to correct changes in the grid control voltage of a thyratron arising from changes in electric source voltage.

Electricity is supplied between the plate 45 and the cathode 46 of the thyraton 44 from the winding 11 for the detecting section 3 of the electric supply source 4, and the coil of the relay K1 is inserted between the thyratron plate 45 and winding 11. To this relay are connected the neon tube 47 for the pilot light, the diode 48 for preventing vibration and the condenser 49 in parallel. When the thyratron 44 fires, the relay K1 is worked by excitation and the contacts d1, d2, d3, d4, as shown in FIGURE 3, and the movable contacts d5, d6 make or close and maintain a controlled circuit. When the thyratron 44 stops conducting, the relay K1 resumes normal position by demagnetization, and the group of contacts d are switched in a way contrary to that described above, setting up another circuit. The thyratron 44 in the application is characterized by having the grid voltage against the plate voltage characteristic shown in FIGURE 5, and conduction and non-conduction can be controlled by changing the grid voltage at a given plate voltage a little from the critical or firing point. The grid control voltage is supplied between the grid 55 and the cathode 46 of the thyratron 44 of the detecting section 3 from the above-mentioned comparing section 2.

The direct current source for grid voltage at the voltage supply source 4 is applied through resistance 52 and the zener diode 53 to the correcting apparatus 4' in a series loop. The potentiometer 54 is connected across to both ends 62, 63 of the zener diode 53 in parallel and permits the abovementioned grid control voltage to be drawn from the movable arm 56 and the electric source end 57 of the resistance 52. Grid control voltage drawn controllably from the movable section 61 and one end of the potentiometer 58 are connected with the bridge of the comparing section 2 and supplied to the cathode 46 of the thyratron 44 of the detecting section 3.

It will be seen that the movable arm 61 of the potentiometer 58 is connected to the cathode 50 of the vacuum tube 24 of the comparing section 2 and one end 59 of the potentiometer 58 is connected to the cathode 46 of the thyratron 44 of the detecting section 3, and signal voltage is applied to the grid 55 of the thyratron 44 of the detecting section 3 from the cathode 51 of the vacuum tube 25 of the comparing section 2 through the grid resistance 60.

Accordingly, the potential difference which arises from the unbalanced bridge between the cathodes 30, 31 of the vacuum tubes 25, 26 of the comparing section 2 as in series with bias voltage supplied through the correcting apparatus 4' and provides a control voltage for firing the thyratron 44 of the detecting section 3.

When the motor M in FIGURE 9 is revolved, the carriage drive mechanism D of the machine run partly by the switching control apparatus in FIGURE 9 and FIGURE 4 begins operating. At the same time, the control bridge system G senses current flowing along one line of the motor M to provide signal voltage from the transducer 1 to the comparing section 2. The grindstone A, shifted by the carriage drive mechanism D, and the article to be abraded, approach each other, and when they are in a certain position as shown in the broken line in FIGURE 9, the direction switch 5 is closed, the relay 41 in FIGURES 1, 2 and 4 is excited, and the contacts 42, 43 become open circuits. In this way, the comparing section 2 stores signals derived from the transducer 1 by current flowing along one line of the load-dispatching circuit for the motor M and compares them with signals derived later by the transducer 1.

When the grindstone A starts grinding the article to be abraded, the load of the motor M increases, and so does current consumed. The transducer 1, therefore, conveys increased signals to the comparing section 2. The comparing section 2 compares these increased signals with those already stored, and when the deviation reaches a certain value, the detecting section 3 responds and the relay K1 in FIGURES 1 and 3 are demagnetized, the contact group d to change the speed of the carriage drive mechanism D are switched, and the speed of movement of the grindstone relative to the work is properly varied. When the grindstone finishes grinding the work, and the load of the motor decreases, the transducer 1, because of a decrease in current consumed, provides reduced signals approximating the values stored in the comparing section 2. The comparing section 2 is thus balanced, exciting the relay K1 in FIGURES 1 and 3 through the detecting section 3, switching the contacts d and restoring the speed of the mechanism D to the original.

The apparatus in the application is designed to repeat the foregoing process. Before working the apparatus, the following steps have to be taken with the aid of a testor and a measuring instrument:

(1) The balance of the vacuum tubes 24, 25;

(2) The adjustment of the potentiometer 54 of the section 4' for correcting changes in voltage;

(3) The adjustment of the firing point of the thyratron 44 in the detecting section 3;

(4) The confirmation of the switching operation of the relay 41 by the push button 70;

(5) The adjustment of the potentiometer 23 of the transducer 1.

To further explain the operation, the motor M revolves, the carriage drive mechanism D begins to move the carriage toward the work, and the direction switch 5 closes just before the surface of the grindstone A contacts the article to be abraded. Closure of the switch 5 energizes relay 41 and the closed contacts 42, 43 open. Thus the condensers 36 stores the electric potential for the grid 27 of the vacuum tube 25 applied across the condenser 36 right before the opening of the contacts 42, 43 and retains it. The comparing section 2, therefore, remains balanced.

When the grindstone A driven by the motor M begins grinding the article to be abraded, current flowing in the lines L, LL of the supply circuit for the motor M increases as mentioned previously. Thus the transducer 1 provides an increased signal voltage to the grid 26 of the vacuum tube 24 through the diode 28. The grid 27 of the other vacuum tube 25 retains the electric potential of the condenser 36 previously stored by the condenser, so that the bridge, including the vacuum tubes 24, 25 goes out of balance in accordance with the increased signals mentioned above. This gives rise to a potential difference between the cathodes 50, 51 of the vacuum tubes 24, 25, which applies reduced voltage to the grid 55 of the thyratron 44 through the resistor 60 to extinguish conduction throuh the thyratron 44. Exciting current for the relay K1 ceases, the contacts in the relay K1 are switched as referred to above, and the speed of the carriage drive mechanism D changes, e.g., into that of grinding.

When the grindstone A finishes grinding the article to be abraded as expected, signals from the transducer 1 decrease, equalling or approximating the electric potential earlier stored by the condenser 36, bringing the bridge of the comparing section 2 near to the state of balance. For this reason, potential differences between the cathodes 50, 51 of the vacuum tubes 24, 25 decreases, and increased voltage is supplied to the grid 54 to fire the thyratron 44. So the thyratron returns to the state of conduction, the relay K1 is excited, and the contacts d are switched. Based on this, as well as other signals from the switching control apparatus, the carriage drive mechanism D is activated to move the grindstone A rapidly away from the article to be abraded. During this return travel, the direction switch 5 is opened. Thus, the contacts 42, 43 of the relay 41 are closed by the open circuit of the direction switch 5 mentioned above, and the same signals are conveyed to the grids 26, 27 of the vacuum tubes 24, 25 from the transducer 1. Any difference between the previously stored charge of the condenser 36 and the new signal level discharges through the resistance 38. When the grindstone A reaches a certain position away from the work, the carriage drive mechanism D is activated to advance the grindstone A toward the article to be abraded. The aforesaid process is repeated at intervals of several seconds.

In a switching control apparatus covered by the present invention, even if current consumed of the motor M with a given load varies in accordance with changes in electric source voltage and phase, the detecting function of the control bridge system is kept approximately normal, because conditions right before the above-mentioned process are compared with those at the next moment. The machine is, therefore, always run properly, and thus the foregoing object is attained.

Figure 7:
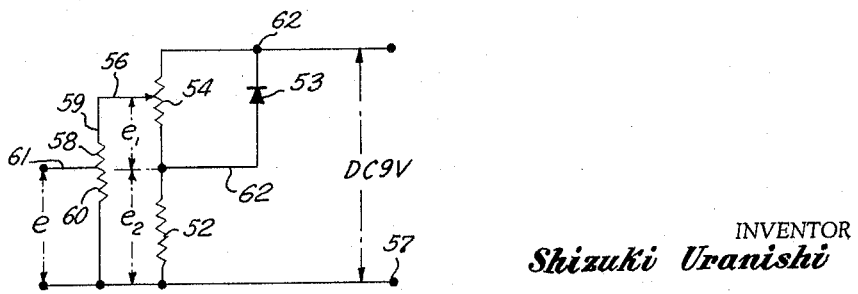
FIGURE 7 is a schematic circuit diagram of the correcting section for correcting grid control voltage rearranged for easier understanding and explained in connection with FIGURE 6.

But the grid voltage of the thyratron 44 has an unstable firing point which is very sensitive to changes in electric source voltage. This necessitates the correcting apparatus 4' which is provided to prevent a lowering of the sensitivity of detecting functions of the transducer 1, the comparing section 2 and the detecting section 3, or their over-sensitive detection. This is illustrated in FIGURE 7. If electric source voltage for the operating point of zener diode 53 is increased sufficiently, voltage at both ends 62, 63 of the zener diode 53 remains unchanged irrespective of changes in electric source voltage. In this condition, changes in electric source voltage appear at both ends of the resistance 52, viz., the whole voltage is divided between constant voltage at both ends 62, 63 of the zener diode 53 and changed voltage at both ends of the resistance 52. If wiring is provided as in FIGURE 7, and the value of the potentiometer 60 is made constant, and that of the other potentiometer 54 adjusted, and the values $e_1$ and $e_2$ in FIGURE 7 made as in the accompanying table, then the grid voltage characteristic curve $g$ of the thyratron in accordance with changes in electric source voltage on the primary side of the electric source transformer 6 in FIGURE 1 can be corrected with freedom. By correcting the operating point according to changes in electric source voltage in the thyratron 44, one can achieve proper operation of the control bridge system in accordance with changes in electric source voltage, using various thyratrons at the option of the user.

To give figures obtained experimentally in use of the invention, electric voltage changes in FIGURE 1 range from 80 to 115 v., and changes in current flowing along one of the lines of the motor with a given load range from 12 to 16 A. Under these unfavorable conditions, if current consumed by the motor changes by 0.2 A. with a change in load, the thyratron 44 is bound to perform switching operation.

Figure 8:
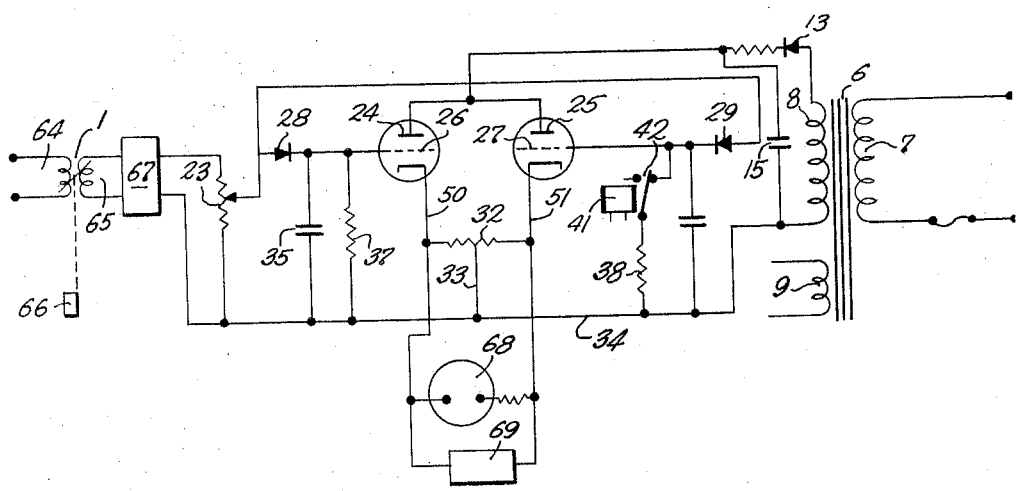
FIGURE 8 illustrates circuit in which the present invention is transformed into a measuring instrument.

The application in FIGURE 8 relates to a switching control apparatus for measuring as a variation of the present invention. The transducer 1 is a variable transformer having a given voltage applied to the primary side 64. The secondary side 65 provides voltage signals in accordance with changes in the measuring section 66, which are applied through the amplifier 67 to the grids 26, 27 of the vacuum tubes 24, 25 from the potentiometer 23 as in the previous case.

To start measuring in a given position of the measuring section 66, the relay 41 is operated by the direction switch, which opens the contact 42. Here, signals stored by the condenser 36 are those from the transducer 1 in the normal conditions of the measuring section 66. All signals more or less than these are applied to the grids 26, 27 of the vacuum tubes 24, 25. The grid 27 of the vacuum tube 25 retains the signals stored by the condenser 36 and electric potential in accordance with the signals produced responsive to altered conditions of the measuring section 66 are supplied to the grid 26 of the vacuum tube 25. So the difference throws the bridge out of balance and presents itself on the meter 68. The switching apparatus 69 of any other machine can also be operated while automatic measuring of various kinds is performed.

In this way, the present invention is characterized by its simple structure which optionally detects and stores certain values in various measuring instruments and compares displacement values with them and indicates the differences.

While but two preferred embodiments of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Switching control apparatus for differentially activating a plurality of controlled circuits responsive to change in a sensible condition of a monitored device when said device is intermittently altered between a first selected state and a second state, comprising a control bridge system including a signal comparing bridge circuit having a pair of opposite legs and a pair of variable resistance devices in the respective opposite legs responsive to the voltage level of signals applied thereto to vary the resistance of the associated leg, transducer means responsive to variations in the sensible condition of the monitored device to continuously apply signals to one of said variable resistance devices for establishing a correlated resistance condition thereof, means for applying signals to the other of said variable resistance devices from said transducer means when said monitored device is in said first state immediately before change to said second state, a relay for switching said controlled circuits, and detector means responsive to selected changes in the relative resistance of the opposite legs of said bridge circuit for activating said relay to switching said controlled circuits.

2. Switching control apparatus for differentially activating a plurality of controlled circuits responsive to change of a preselected amount in the current drawn by an electric motor responsive to changes in current flowing in a supply conductor to the motor when the motor is changed from a normal load state to a different load state, comprising a control bridge system including a signal comparing bridge circuit having a pair of opposite legs and a pair of variable resistance devices in the respective opposite legs responsive to the voltage level of signals applied thereto to vary the resistance of the associated leg, transducer means responsive to the current flow through said supply conductor to continuously apply signals to one of said variable resistance devices for establishing a correlated resistance condition thereof, means for applying signals to the other of said variable resistance devices from said transducer means when said motor occupies said normal load condition immediately prior to change to said increased load condition, a relay for switching said controlled circuits, and detector means responsive to selected changes in the relative resistance of the opposite legs of said bridge circuit for activating said relay to switching said controlled circuits.

3. Switching control apparatus for differentially activating a plurality of controlled circuits responsive to change of a preselected amount in the current drawn by an electric motor responsive to changes in current flowing in a supply conductor to the motor when the motor is changed from a normal load sate to a different load state, comprising a control bridge system including a signal comparing bridge circuit having a pair of opposite legs and a pair of variable resistance devices in the respective opposite legs responsive to the voltage level of signals applied thereto to vary the resistance of the associated leg, transducer means responsive to the current flow through said supply conductor to continuously apply signals to one of said variable resistance devices for establishing a correlated resistance condition thereof, means for applying signals to the other of said variable resistance devices from said transducer means when said motor occupies said normal load condition immediately prior to change to said increased load condition, and substantially retaining such signals level on said other variable resistance a device throughout persistance of said different load states, a relay for switching said controlled circuits, and detector means responsive to selected changes in the relative resistance of the opposite legs of said bridge circuit for activating said relay to switching said controlled circuits.

4. Switching control apparatus for automatically switching between a pair of controlled circuits responsive to changes of selected amounts in current flow in a supply conductor of an electric motor as the motor alternates intermittently between a normal load state and a different load state, which control apparatus remains operative notwithstanding changes in supply voltage or phase, comprising a control bridge system including a signal comparing bridge circuit having a pair of opposite legs and a pair of vacuum tubes and resistors in the respective legs, transducer means responsive to the current flow through said supply conductor to continuously apply voltage to one of said vacuum tubes correlated to said current flow to vary conductions through the same and the associated bridge leg in selected relation to current flow in said supply conductor, voltage storage means connected to the other of said vacuum tubes for regulating conduction therethrough, means for applying to said voltage storage means voltage from said transducer means correlated to said current flow when said motor is in normal load state immediately prior to assumption of the different load state, said storage means applying the voltage level stored thereby to said other of said vacuum tubes throughout the period the motor occupies said different load state, a relay for switching said controlled circuits, and detector means to respond to balanced and unbalanced electrical conditions of the legs of said bridge circuit for activating said relay to switch said controlled circuits when said motor changes from one of said states to the other.

5. Switching control apparatus for automatically switching between a pair of controlled circuits responsive to changes of selected amounts in current flow in a supply conductor of an electric motor as the motor alternates intermittently between a normal load state and a different load state, which control apparatus remains operative notwithstanding changes in supply voltage or phase, comprising a control bridge system including a signal comparing bridge circuit having a pair of opposite legs and a pair of vacuum tubes and resistors in the respective legs, transducer means responsive to the current flow through said supply conductor to continuously apply voltage to one of said vacuum tubes correlated to said current flow to vary conductions through the same and the associated bridge leg in selected relation to current flow in said supply conductor, voltage storage means connected to the other of said vacuum tubes for regulating conduction therethrough, means for applying to said voltage storage means voltage from said transducer means correlated to said current flow when said motor is in normal load state immediately prior to assumption of the different load state, said storage means applying the voltage level stored thereby to said other of said vacuum tubes throughout the period the motor occupies said different load state, a relay for switching said controlled circuits, and a thyratron having a control grid connected to said bridge to respond to balanced and unbalanced electrical conditions of the legs of said bridge circuit for activating said relay to switch said controlled circuits when said motor changes from one of said states to the other.

6. In a switching control apparatus defined in claim 5, said storage means comprising a capacitor having a plate connected to said other of said vacuum tubes to apply control voltage thereto, and a relay having a first set of contacts for selectively applying the voltage from said transducer means across said capacitor and a second set of contacts for selectively discharging said capacitor.

7. In a switching control apparatus as defined in claim 5, said thyratron having a cathode and a control grid, and each of said vacuum tubes in said bridge circuit having a cathode directly connected to the resistance in its associated leg, means connecting the cathode of the other of said vacuum tubes to said thyratron grid, correcting means for providing direct current voltage which varies with variation in the supply voltage to the switching apparatus, and means connecting the cathode of said one of said vacuum tubes through said correcting means to the cathode of said thyratron to maintain correct firing action of the thyratron despite variations in supply voltage.

References Cited by the Examiner

UNITED STATES PATENTS 2,676,286    4/1954    Buchner            317—149
2,683,214    7/1954    Henquet et al.       328—146

STEPHEN W. CAPELLI, *Primary Examiner.*

L. T. HIX, *Assistant Examiner.*